United States Patent [19]
Hill

[11] 3,731,456
[45] May 8, 1973

[54] ANIMAL HALTER
[76] Inventor: Richard S. Hill, 302 W. Steadman, Sherman, Tex. 75090
[22] Filed: May 4, 1971
[21] Appl. No.: 140,105

[52] U.S. Cl. ............................................. 54/24
[51] Int. Cl. ...................................... B68b 01/02
[58] Field of Search ........................... 54/24, 6

[56] References Cited

UNITED STATES PATENTS

| 3,263,399 | 8/1966 | Faragher | 54/24 X |
| 3,306,005 | 2/1967 | Stafford | 54/24 X |
| 675,910 | 6/1901 | Thomas | 54/24 |

*Primary Examiner*—Hugh R. Chamblee
*Attorney*—Beveridge & De Grandi

[57] ABSTRACT

An animal halter including generally cylindrical cables of small diameter made from relatively hard, self-supporting material, and extending across the pole of the animal's neck and the bridge of the animal's nose to apply direct pressure thereon for controlling or training the animal when the halter is stressed during use.

13 Claims, 4 Drawing Figures

Patented May 8, 1973

3,731,456

INVENTOR
RICHARD S. HILL

BY Beveridge & De Grandi

ATTORNEYS

ANIMAL HALTER

SUMMARY OF INVENTION

The present invention relates to animal halters, and has for one of its objects the provision of a novel halter assembly which will ensure effective control of an animal for a variety of different purposes.

A further object of the present invention is to provide an animal halter of new construction while also including a novel combination of elements.

A further object of the present invention is to provide such an animal halter which may be easily applied and removed from the animal while being usable on various types of animals including horses, cattle and broncos.

A still further object of the present invention is to provide an animal halter assembly which will achieve the above objects and yet may be made from standard materials to obtain a durable construction lasting the lifetime of the animal.

The above and other objects are achieved by a halter assembly including two metallic steel rings and a first cable with loops formed on its ends respectively receiving the rings to be movable along the rings. The cable is dimensioned to extend over the pole of the animal's neck with the rings being located adjacent the mouth on opposite sides of the animal's head. A second cable having similar looped ends is similarly attached to said rings respectively. The second cable has a much lesser length than the first cable since it is to be placed across the bridge of the animal's nose. For securing the halter on the animal's head, an adjustable strap, which may be a conventional leather, buckle-type strap, is connected between said rings so as to pass under the chin of the animal.

In accordance with the invention, the cables are formed of relatively hard self-supporting material and of a small cross-sectional, preferably convexly curved shape so as to apply concentrated pressure on the pole of the animal's neck and the bridge of the animal's nose when the halter is subjected to stress during use. In one embodiment, each cable is formed with a metallic core, for example, one-eighth of an inch wire cable, and a first plastic sheath made from a vinyl-like material, encasing the core with a tight fit throughout the full length of the core. Additionally, a second sheath made from a relatively hard plastic material of the type used for surgical tubing, is encased about said first sheath with a snug fit. The second sheath has a circular cross-section with an outside diameter of approximately five-sixteenths of an inch while the first sheath also has a circular cross-section with an outside diameter of approximately three-sixteenths of an inch. The resulting cable is one which will maintain its cross-sectional shape while being relatively hard with respect to radial compression so that it will apply effective pressure on the animal at the areas indicated. Additionally, in view of the sturdy construction of the cable, the first cable will extend from the rings along a generally circular path so that the top portion of the cable will contact the pole on the animal's neck at a limited area to provide concentrated direct pressure on the pole of the animal's neck.

In one embodiment of the invention, a third cable having a length longer than the said first cable, is provided with its opposite ends passed through said rings and interconnected to each other by means of a releasable hook and ring assembly connected to the end portions thereof. This third cable also is placed over the head of the animal with the top portion engaged on the pole of the animal's neck in the same manner as the first cable. However, the third cable is more flexible in its construction than said first and second cables. The third cable is employed to attach a rein or other control rope or member to the halter assembly for purposes of training, tying, or otherwise controlling the animal in some manner through the halter. In a modified form of the invention, the third cable may be removed and replaced by a chain which extends under the chain of the animal for purposes of tying a rein or other control member thereto. The chain may also be designed with sufficient length to permit it to be placed over the upper lip of the animal for purposes of curing a twitch.

Other objects and advantages of the present invention will become apparent from the following more detailed description taken in conjunction with the attached drawings in which.

DETAILED DESCRIPTION

Figure 1:
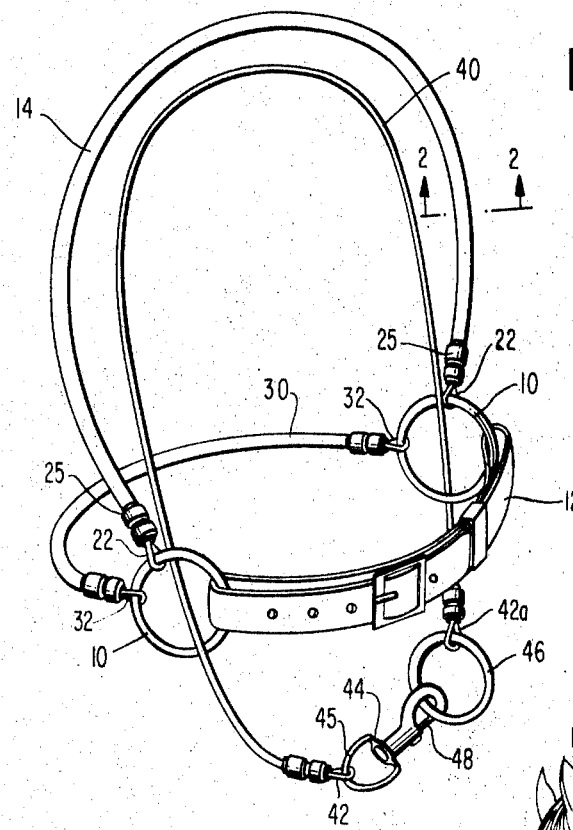
FIG. 1 is a perspective view of an animal halter assembly embodying the invention.

Referring to the drawings in detail, there is shown a halter assembly embodying the invention including a pair of rings 10 made from any suitable preferably rigid material such as steel, and an adjustable strap 12 which may be a conventional buckle-type strap, received and interconnecting said rings in the manner clearly shown in FIG. 1. Strap 12 is used to secure the halter assembly to the animal's head as will become more apparent subsequently. The adjustability of the strap 12 enables adjustment to fit the particular size of the animal's head.

Figure 3:
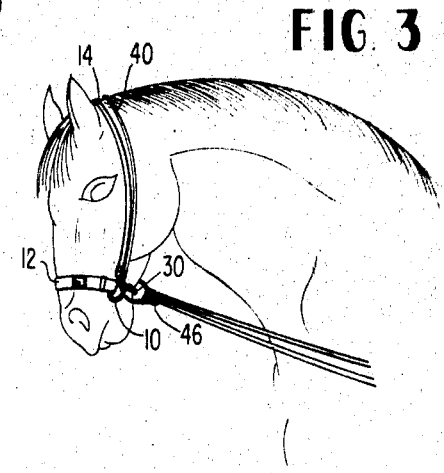
FIG. 3 is a perspective view illustrating the halter assembly of FIG. 1 as applied to a horse.

The halter assembly further includes a first cable 14 having its opposite ends connected to rings 10 as clearly shown in FIG. 1. Cable 14 is designed with a length to permit it to be received over the pole of an animal's neck as shown in FIG. 3. In accordance with the invention, cable 14 is formed with a relatively small width or cross-dimension, and with a self-supporting construction which is relatively hard or unyielding when subjected to radial compression forces, so as to enable concentrated pressure to be applied to the pole of the animal's neck. Additionally, cable 14 is constructed so that when pulled downwardly when in use, the top of the cable will be caused to directly engage the pole of the animal's neck at concentrated areas to apply concentrated direct pressure for purposes of training or controlling the animal.

Figure 2:
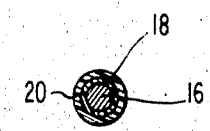
FIG. 2 is a cross-sectional view taken generally along lines 2—2 of FIG. 1.

In the preferred embodiment shown which is particularly suitable for commercial production, cable 14 is formed with a construction including a steel metallic wire cable core 16 having a diameter of approximately one-eighth of an inch, and a tight fitting first hollow, cylindrical sheath or housing 18 made from a vinyllike plastic material with an outside diameter of approximately three-sixteenths of an inch. Sheath 18 tightly receives core 16 and completely encases it throughout the full length thereof. Additionally, cable 14 includes a second hollow, cylindrical sheath or housing 20 snugly receiving the first sheath 18 as clearly shown in FIG. 2. Second sheath 20 is made from a tough sturdy plastic tubing material such a polyethylene, polypropylene, or vinyl with an outside diameter of five-sixteenths of an inch (used in surgical hosing or tubing) and extends substantially throughout the length of the first sheath 18 except for the end portions of the cable on which loops 22 are formed as will be described. The resulting cable construction is one which is self-supporting and while being somewhat flexible to permit it to be flexed over portions of the animal's head, it is very hard in the radial dimension so that it will maintain its cross-sectional shape and be relatively unyieldable to radial compression forces. The cable will thus maintain its circular shape and present a hard unyielding member against the pole of the animal's neck when in use. Furthermore, because of the limited flexiblity of cable 14 and the fact that it is self-supporting, it will normally extend along a circular path between the rings as shown in FIg. 1 so that when the halter is stressed, the first point to come into contact with the animal will be the top portion of the cable 14 which will engage the pole of the animals's neck to apply concentrated direct pressure thereon. The latter effect is augmented by the nature of the cable construction wherein its curvature concentrates contact of the cable on the pole of the animal's neck rather than distributing forces throughout the various parts of the animal's head.

In the particular embodiment shown, the ends of cable 14 are connected to rings 10 by loops 22 formed by passing the ends of the cable first through associated rings 10 and then turning them back through sleeves 25 axially received on the end portions of the cable. After the turn-backed end portions of the cable are received in the associated sleeves 25, the latter are crimped inwardly to fix the turn-backed portions of the cable therein thus forming permanent loops 22. It will be understood that outer sheath 20 has a length terminating just short of sleeves 25.

Cable 30 has the same metallic core and double sheath construction as cable 14. However the length of cable 30 is shorter as shown in the drawings as it is to be placed over the bridge of the animal's nose. Because of its construction, cable 30 will extend in an arch over the bridge of the animal's nose such that when the halter is stressed when in use, there will be point contact by the apex of cable 30 on the bridge of the animal's nose, which will be highly concentrated pressure for effective control or training of the animal.

In the embodiment of the halter assembly shown in FIG. 1, the rein or other controlling rope, cord, etc. is attached to the halter assembly by means of another cable 40 which is made from a steel, wire cable core and a single sheath the same as 16 and 18 incorporated in cables 14 and 30 described above. The second or outer sheath 20 employed in cables 14 and 30 is not employed on cable 40 since it is desired that cable 40 be more flexible for use in attaching a control line or rein through the halter assembly. The opposite end portions of cable 40 are inserted through rings 10 as clearly shown in FIG. 1 and then releasably interconnected in any suitable manner such as the conventional hook and ring assembly 44, 46 clearly shown in FIG. 1. Hook 44 has an eye 45 which receives loop 42 on one end of cable 40. The loop 42a on the other end of cable 40 is received about a ring 46 which is releasably connected to a hook 44 by means of a movable latch 48. A rein or similar control member may be attached to cable 40 by securing it to ring 46 below the animal's head. Cable 40 may be removed from the halter by moving latch 48 to open hook 44 and removing ring 46 after which ring 46 may be grasped to pull cable through rings 10.

Figure 4:
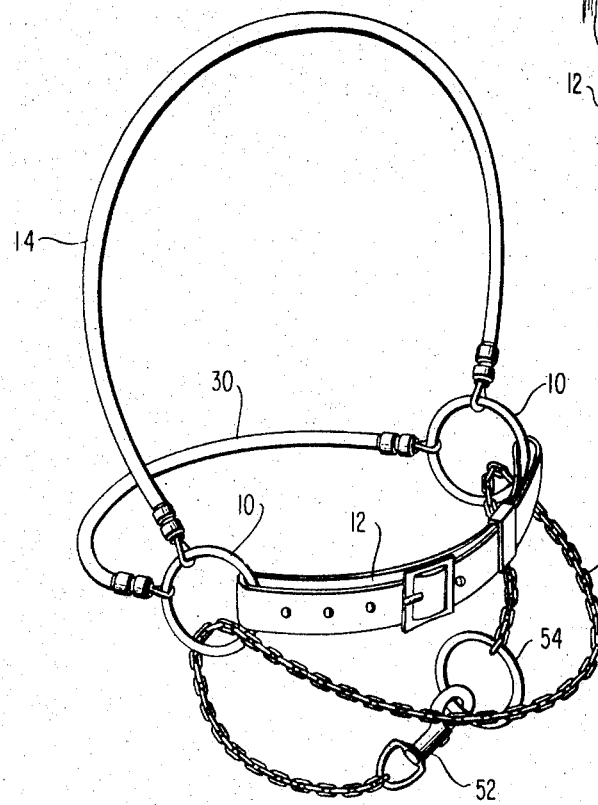
FIG. 4 is a perspective view illustrating a modified form of the halter assembly.

If desired and depending on the particular control or training to be imparted to the animal, cable 40 may be replaced by a cable such as a chain 50 shown in FIG. 4. Chain 50 is also placed through both rings 10 and interconnected by a suitable releasable fastener such as a hook and ring 52 and 54. Among other uses, the embodiment shown in FIG. 4 may be employed to cure a twitch by placing chain 50 over the upper lip of the animal.

It will also now become apparent that the halter of the present invention may be employed for a variety of purposes, including teaching an animal to lead or to stay tyed, as well as tying down an animal. Additionally, the halter may be employed as a hackamore halter, a gyping halter, a show halter, a race horse halter. Additionally, the halter of the present invention may be used on club calves as well as show cattle or broncos.

What is claimed is:

1. A halter assembly for an animal, comprising in combination, a pair of annular members, a first cable having opposite ends respectively connected to said annular members and extending therebetween with sufficient length for placement over the head of an animal with the annular members located on opposite sides of the animal's head adjacent the mouth and the central portion of the cable extending over the pole of the animal's neck for applying pressure thereon when the halter is stressed during use, a second cable having its opposite ends connected to said annular members for placement over the bridge of an animal's nose for applying pressure thereon, and a strap means having its opposite ends connected to said annular members for receipt under the chin of the animal for securing the halter thereon, said cables having a convexly curved profile in transverse cross section and being made from relatively hard self-supporting material for applying pressure on the pole of the animal's neck and the bridge of the animal's nose when the halter is stressed in use for controlling or training the animal, each of said cables including a metallic core having a generally circular cross section, and a tubular sheath entirely encasing said core throughout the full length of said cable.

2. The halter assembly defined in claim 1 wherein each of said cables further includes a second sheath having a generally circular cross-section entirely encasing said first sheath substantially throughout the full length thereof, said first sheath being in tight fitting relationship with said metallic core, and said second sheath tightly receiving said first sheath.

3. The halter assembly defined in claim 2 wherein in each of said cables, the metallic core has a diameter of approximately one-eighth of an inch, said first sheath has an outside diameter of approximately three-sixteenths of an inch, and said second sheath has an outside diameter of approximately five-sixteenths of an inch, said sheath being made from self-supporting plastic material.

4. The halter assembly defined in claim 3 wherein said annular members are rigid rings and wherein each of said cables has loops formed on the opposite ends thereof respectively received on the rings for movably attaching the cables on the rings.

5. The halter assembly defined in claim 4 wherein said first sheath is made from a vinyl-like plastic material and said second sheath is made from plastic surgical tubing.

6. The halter assembly defined in claim 4 wherein said strap means is adjustable in length for varying the maximum distance between the rings to suit the particular head size of the animal on which the halter assembly is to be used.

7. The halter assembly defined in claim 6 wherein said adjustable strap means includes a leather strap including a buckle means.

8. A halter assembly defined in claim 1 wherein said first cable in its normal state extends generally along a circular path between said annular members so as to apply concentrated pressure contact on the pole of the animal's neck when the halter assembly in stressed during use.

9. A halter assembly for an animal, comprising in combination, a pair of annular members, a first cable having opposite ends respectively connected to said annular members and extending therebetween with sufficient length for placement over the head of an animal with the annular members located on opposite sides of the animal's head adjacent the mouth and the central portion of the cable extending over the pole of the animal's neck for applying pressure thereon when the halter is stressed during use, a second cable having its opposite ends connected to said annular members for placement over the bridge of an animal's nose for applying pressure thereon, and a strap means having its opposite ends connected to said annular members for receipt under the chin of the animal for securing the halter thereon, said cables having a convexly curved profile in transverse cross section and being made from relatively hard self-supporting material for applying pressure on the pole of the animal's neck and the bridge of the animal's nose when the halter is stressed in use for controlling or training the animal, a third cable having a length greater than said first cable and having opposite end portions respectively received through said annular members and connecting means on said end portions releasable interconnecting said end portions, said third cable adapted to also be placed over the animal's head with the central portion of the third cable engaged on the pole of the animal's neck for applying pressure thereon when the halter is stressed in use, said end portions adapted to be located under the animal's head for purposes of attaching a rein or other control member to the halter assembly.

10. The halter assembly defined in claim 9 wherein said third cable includes a metallic core and a plastic sheath tightly receiving said metallic core throughout the entire length thereof.

11. A halter assembly for an animal, comprising in combination, a pair of annular members, a first cable having opposite ends respectively connected to said annular members and extending therebetween with sufficient length for placement over the head of an animal with the annular members located on opposite sides of the animal's head adjacent the mouth and the central portion of the cable extending over the pole of the animal's neck for applying pressure thereon when the halter is stressed during use, a second cable having its opposite ends connected to said annular members for placement over the bridge of an animal's nose for applying pressure thereon, and a strap means having its opposite ends connected to said annular members for receipt under the chin of the animal for securing the halter thereon, said cables having a convexly curved profile in transverse cross section and being made from relatively hard self-supporting material for applying pressure on the pole of the animal's neck and the bridge of the animal's nose when the halter is stressed in use for controlling or training the animal, a chain having opposite ends connected to said annular members respectively and adapted to be received under the chin of the animal, said chain being employed for tying a rein or similar control member thereto through which stress may be applied to the halter when in use for controlling or training the animal.

12. A halter assembly for an animal, comprising in combination a pair of annular members, a first cable having opposite ends respectively connected to said annular members and extending therebetween with sufficient length for placement over the head of an animal with the annular members located on opposite sides of the animal's head adjacent the mouth and the central portion of the cable extending over the pole of the animal's neck for applying pressure thereon when the halter is on an animal in use, a second cable having its opposite ends connected to said annular members for placement over the bridge of an animal's nose for applying pressure thereon, connecting means having its opposite ends connected to said annular members for receipt under the chain of the animal for securing the halter thereon, said cables being made from relatively hard self-supporting material for applying pressure on the pole of the animal's neck and the bridge of the animal's nose when the halter is in use on an animal for controlling or training the animal, a third cable having a length greater than said first cable and having opposite end portions respectively received through said annular members and connecting means on said end portions releasably interconnecting said end portions, said third cable adapted to also be placed over the animal's head with the central portion of the third cable engaged on the pole of the animal's neck for applying pressure thereon, said end portions adapted to be located under the animal's head for purposes of attaching a rein or other control member to the halter assembly.

13. A halter assembly for an animal, comprising in combination, a pair of annular members, a first cable having opposite ends respectively connected to said annular members and extending therebetween with sufficient length for placement over the head of an animal with the annular members located on opposite sides of the animal's head adjacent the mouth and the central portion of the cable extending over the pole of the animal's neck for applying pressure thereon when the halter is in use on an animal, a second cable having its opposite ends connected to said annular members for placement over the bridge of an animal's nose for applying pressure thereon, connecting means having its opposite ends connected to said annular members for receipt under the chin of the animal for securing the halter thereon, said cables being made from relatively hard self-supporting material for applying pressure on the pole of the animal's neck and the bridge of the animal's nose when the halter is in use on an animal for controlling or training the animal, and a third cable member received through said annular members respectively and adapted to be received under the chin of the animal, said third cable member being employed for tying a rein or similar control member thereto through which stress may be applied to the halter when in use for controlling or training the animal.

* * * * *